(12) United States Patent
Lee et al.

(10) Patent No.: US 11,258,073 B2
(45) Date of Patent: Feb. 22, 2022

(54) ELECTRODE ASSEMBLY AND METHOD FOR MANUFACTURING THE SAME

(71) Applicant: LG CHEM, LTD., Seoul (KR)

(72) Inventors: Won Jong Lee, Daejeon (KR); Hyoung Sik Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 140 days.

(21) Appl. No.: 16/493,976

(22) PCT Filed: Nov. 8, 2018

(86) PCT No.: PCT/KR2018/013561
§ 371 (c)(1),
(2) Date: Sep. 13, 2019

(87) PCT Pub. No.: WO2019/124733
PCT Pub. Date: Jun. 27, 2019

(65) Prior Publication Data
US 2020/0127297 A1    Apr. 23, 2020

(30) Foreign Application Priority Data

Dec. 19, 2017    (KR) .......................... 10-2017-0175176

(51) Int. Cl.
*H01M 10/0583* (2010.01)
*H01M 4/88* (2006.01)
(Continued)

(52) U.S. Cl.
CPC ..... *H01M 4/8875* (2013.01); *H01M 10/0583* (2013.01); *H01M 50/46* (2021.01); *H01M 2004/027* (2013.01); *H01M 2004/028* (2013.01)

(58) Field of Classification Search
CPC ......... H01M 10/0413; H01M 10/0436; H01M 10/052; H01M 10/0583; H01M 10/0585;
(Continued)

(56) References Cited

U.S. PATENT DOCUMENTS

2015/0044536 A1    2/2015 Kwon et al.
2015/0255775 A1    9/2015 Kwon et al.
(Continued)

FOREIGN PATENT DOCUMENTS

EP          3 340 358 A1   6/2018
KR    10-2005-0066652 A   6/2005
(Continued)

OTHER PUBLICATIONS

International Search Report issued in PCT/KR2018/013561 (PCT/ISA/210), dated Feb. 22, 2019.
(Continued)

*Primary Examiner* — Victoria H Lynch
(74) *Attorney, Agent, or Firm* — Birch, Stewart, Kolasch & Birch, LLP (57) ABSTRACT

A method for manufacturing an electrode assembly includes forming each of a negative electrode, a separator, and a positive electrode so as to have a shape having a hole; laminating the negative electrode, the separator, and the positive electrode to manufacture a unit cell; laminating at least two unit cells to form a laminate; folding a folding separator to cover an entire surface of the laminate to wrap an outside of the laminate; removing a portion of a space forming part that is a portion of the folding separator surrounding a space formed by the aligned holes when the folding separator is folded to wrap the laminate; and bonding surplus parts that are portions of the folding separator to each other after the portion of the space forming part is removed so as to finish the folding separator to cover an exposed surface of the laminate is provided.

8 Claims, 7 Drawing Sheets

(51) Int. Cl.
*H01M 50/46* (2021.01)
*H01M 4/02* (2006.01)

(58) Field of Classification Search
CPC ..... H01M 2004/024; H01M 2004/028; H01M 4/8875; H01M 50/10; H01M 50/116; H01M 50/46; Y02E 60/10; Y02E 60/50
See application file for complete search history.

(56) References Cited

U.S. PATENT DOCUMENTS

| | | |
|---|---|---|
| 2016/0359147 A1 | 12/2016 | Kang |
| 2017/0092923 A1 | 3/2017 | Pasma et al. |
| 2018/0287106 A1 | 10/2018 | Schoenherr |
| 2019/0259979 A1 | 8/2019 | Ryu et al. |

FOREIGN PATENT DOCUMENTS

| | | |
|---|---|---|
| KR | 10-2008-0005624 A | 1/2008 |
| KR | 10-2014-0101649 A | 8/2014 |
| KR | 10-2015-0083521 A | 7/2015 |
| KR | 10-2016-0015770 A | 2/2016 |
| KR | 10-2016-0016173 A | 2/2016 |
| KR | 10-2016-0120509 A | 10/2016 |
| KR | 10-2016-0142679 A | 12/2016 |
| KR | 10-2017-0001281 A | 1/2017 |
| KR | 10-2017-0022589 A | 3/2017 |
| KR | 10-2017-0121603 A | 11/2017 |
| WO | WO 2017/063877 A | 4/2017 |

OTHER PUBLICATIONS

Supplementary European Search Report dated Apr. 3, 2020 dated in EP 18891718.

ELECTRODE ASSEMBLY AND METHOD FOR MANUFACTURING THE SAME

CROSS-REFERENCE TO RELATED APPLICATION

The present application claims the benefit of the priority of Korean Patent Application No. 10-2017-0175176, filed on Dec. 19, 2017, which is hereby incorporated by reference in its entirety.

TECHNICAL FIELD

The present invention relates to an electrode assembly and a method for manufacturing the same, and more particularly, to an electrode assembly, which is capable of being manufactured in an irregular shape suitable for a device to be mounted and has improved toughness against an external impact, and a method for manufacturing the same.

BACKGROUND ART

The demand for secondary batteries as energy sources is rapidly increasing in various fields comprising personal portable terminal and electric vehicle fields.

Unlike primary batteries, rechargeable secondary batteries are being developed not only for digital devices but also for vehicles such as electric vehicles.

Secondary batteries are variously classified according to materials and external shapes of a positive electrode and a negative electrode. Among them, since such a lithium secondary battery using a lithium compound material has large capacity and a low self-discharge rate, the lithium secondary battery is being widely used as power sources of various electrical devices instead of a nickel-cadmium secondary battery according to the related art.

Also, the lithium secondary battery may be manufactured in various shapes. Representatively, the lithium secondary battery may be classified into a cylinder type secondary battery, a prismatic type secondary battery, and a pouch type secondary battery. Here, an electrode assembly for charging and discharging electric energy is built in a case. The electrode assembly has a structure in which a negative electrode, a separator, and a positive electrode are stacked and is built together with an electrolyte in the case (the pouch or cylinder type case or the like).

Secondary batteries that have been recently developed may have may have an irregular shape suitable for a size and/or shape of a mounting space according to the battery mounting space of a device to be mounted. For example, each of both sides of a straight portion is bent at a right angle. Here, the bent portions may have a '⊏' shape in which the bent portions are formed in parallel to each other in the same direction or an 'L' shape in which one side of the straight portion is bent at a right angle. The irregularly-shaped secondary battery having the above-described shape is manufactured by customizing a pouch (or a case and the like) according to the shape of an irregular electrode assembly.

However, such the irregularly-shaped secondary battery may be vulnerable to the external impact when compared to the conventional structure in which both sides are symmetrical in size. That is, in the case of the conventional structure, an impact may be dispersed even though the impact is applied from one side thereof. However, in the case of the '⊏' shape or the 'L' shape, there is a problem that a risk of damage due to an external impact relatively increases because the impact is concentrated at the bent point.

DISCLOSURE OF THE INVENTION

Technical Problem

Accordingly, to solve the above problem, a main object of the present invention is to provide an electrode assembly having improved safety to reduce a risk of damage due to an external impact and a method for manufacturing the same.

Technical Solution

Figure 5:
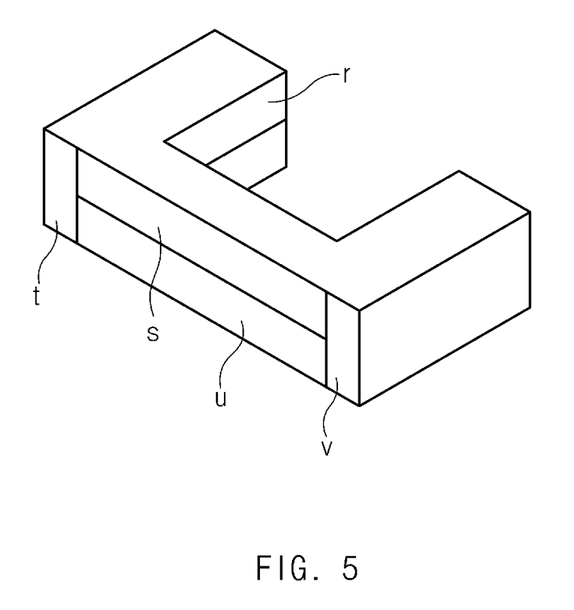
FIG. 5 is a perspective view illustrating a state in which the laminate of FIG. 4 is finished after being wrapped by the folding separator.
Figure 6:
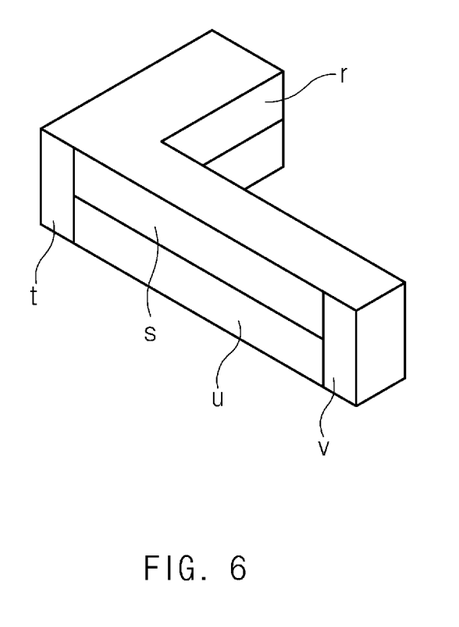
FIG. 6 and FIG. 7 are perspective views each illustrating a state in which the laminates having different shapes are finished after being wrapped by the folding separator.
Figure 7:
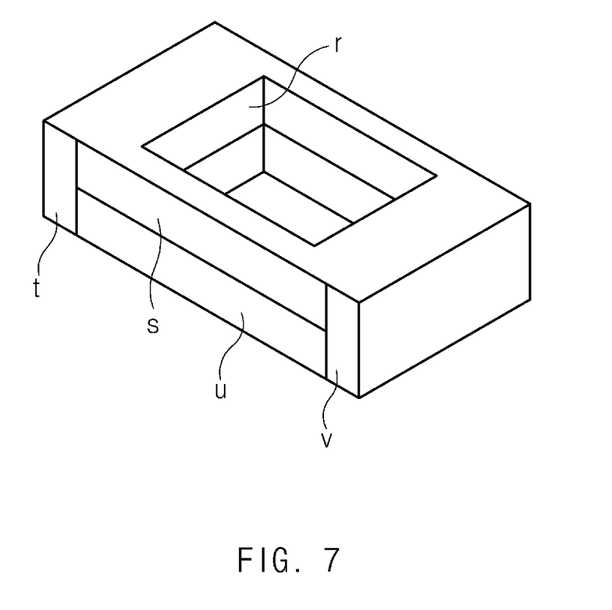

To achieve the above-described object, a method for manufacturing an electrode assembly according to the present invention comprises: forming each of a negative electrode, a separator, and a positive electrode so as to have a shape having a hole; laminating the negative electrode, the separator, and the positive electrode so that the holes are aligned so as to manufacture a unit cell; laminating at least two unit cells to form a laminate; folding a folding separator having an area that is large enough to cover an entire surface of the laminate to wrap an outside of the laminate; removing a portion of a space forming part that is a portion of the folding separator surrounding a space formed by the aligned holes when the folding separator is folded to wrap the outside of the laminate; and bonding surplus parts that are portions of the folding separator, which are not initially attached to the laminate, to each other after the portion of the space forming part is removed so as to finish the folding separator to cover an exposed surface of the laminate. Here, each of the holes refers to a hole that is removed in any direction or opened. For example, the hole may have a shape of which a portion is removed in a lateral direction as illustrated in FIGS. 5 and 6 or a shape having a portion that is vertically penetrated as illustrated in FIG. 7.

The unit cell may have a shape of which at least one edge of the unit cell is bent. For example, the unit cell may have a shape (i.e., a '⊏' shape) of which both sides having a straight line shape are bent at a right angle, but the bent portions are parallel to each other in the same direction or a shape (i.e., a 'L' shape) of which one side having a straight line shape is bent at a right angle.

According to the present invention, the folding separator may be made of a material having a toughness greater than that of the separator laminated between the negative electrode and the positive electrode in the unit cell, wherein the folding separator may be bonded when heat is applied thereto. The term "toughness" as used herein means mechanical properties of the separator which is capable of being obtained through a kind and thickness of a separator source, a composition of a coating layer applied thereon, and a thickness adjustment, and the like. The unit cell may have a mono-cell structure in which the separator, the negative electrode, the separator, and the positive electrode are sequentially laminated upward.

The space forming part may be cut from the folding separator by using a forming device, wherein the space forming part may be removed such that a size of each of the surplus parts is enough to cover at least a portion of an adjacent surface of the laminate to finish the folding separator by bonding the surplus parts to each other.

Furthermore, an electrode assembly according to the present invention comprises: a laminate comprising a plurality of unit cells, each unit cell having a negative electrode, a separator, and a positive electrode, each of the negative electrode, the separator, and the positive electrode having a hole such that the holes are aligned; and a folding separator made of a material having a toughness greater than that of the separator laminated between the negative electrode and the positive electrode in each unit cell, the folding separator having an area that is large enough to cover an entire surface of the laminate, and the folding separator is folded in one direction to surround the laminate, wherein the folding separator is finished such that surplus parts, which are remaining portions of the folding separator extending beyond the laminate after the laminate is folded in the one direction, are bonded to each other to enclose the laminate.

Advantageous Effects

The prevent invention having the above-described configuration may have the effect of improving the safety against the external impact because the folding separator additionally wraps the electrode assembly even though the electrode assembly has the irregular shape according to the mounting conditions.

The folding separator may have the relatively greater hardiness than that of the separator and also be easily finished because the folding separator adheres when the heat is applied.

MODE FOR CARRYING OUT THE INVENTION

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode assembly, which is manufactured in an irregular shape such as a '⊏', '∟', or '☐' shape except for a general rectangular or cylindrical shape and has improved toughness against an external impact, and a method for manufacturing the same. Hereinafter, embodiments of the present invention will be described in more detail with reference to the accompanying drawings.

Embodiment 1

Figure 1:
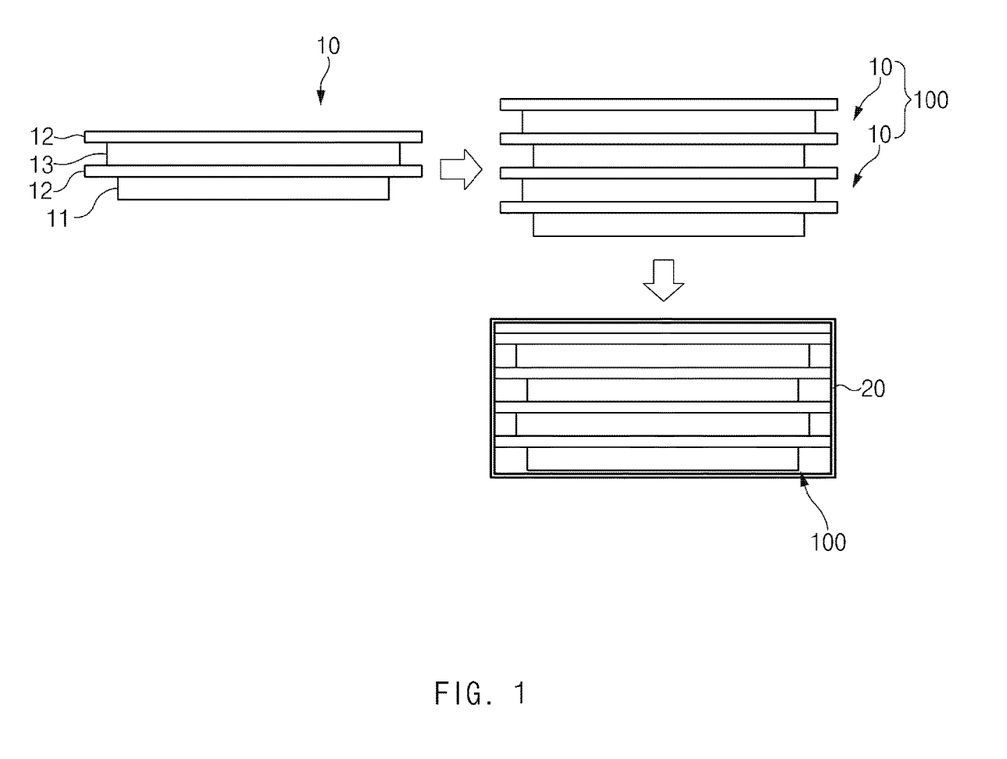
FIG. 1 is a cross-sectional view illustrating a state in which a laminate is wrapped by a folding separator when unit cells are laminated to form the laminate.

This embodiment provides a method for manufacturing an electrode assembly having an irregular shape (a shape having a hole). As illustrated in FIG. 1, in the manufacturing method according to the present invention, a negative electrode 13, a separator 12, and a positive electrode 11 are manufactured in the same shape capable of being laminated and then are laminated to form a unit cell 10. Thereafter, at least two or more unit cells 10 (preferably, about ten unit cells 10) are laminated to form a laminate 100, and a folding separator 20 is folded to surround the laminate 100.

In more detail, in the manufacturing method, first, each of the negative electrode 12, the separator 12, and the positive electrode 11 is formed in the same shape (which is capable of being laminated even if sizes are somewhat different from each other), i.e., in a shape having a hole. Here, each of the holes refers to a hole that is removed in any direction or opened. For example, the hole may have a shape of which a portion is removed in a lateral direction as illustrated in FIGS. 5 and 6 or a shape having a portion that is vertically penetrated as illustrated in FIG. 7.

Figure 2:
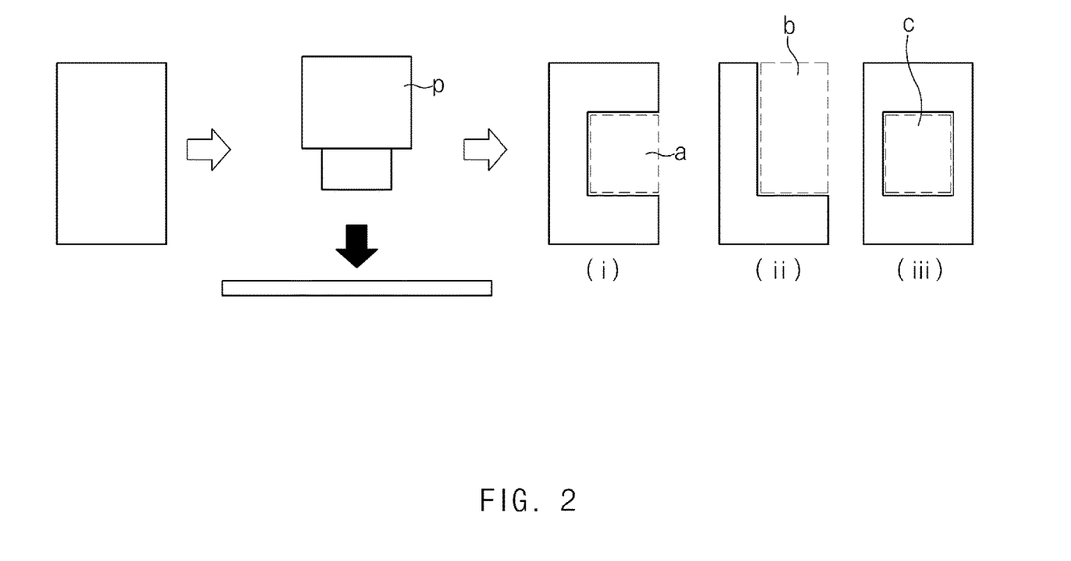
FIG. 2 is a view illustrating shapes (FIGS. 2(*i*), 2(*ii*), and 2(*iii*)) in which each of a negative electrode, a separator, and a positive electrode is capable of being formed by a punching device.

That is, each of the negative electrode 13, the separator 12, and the positive electrode 11 may be manufactured in a rectangular flat plate shape like the conventional shape and then be manufactured in '⊏' of FIG. 2(*i*), '∟' of FIG. 2(*ii*), and '☐' of FIG. 2(*iii*) through a punching device p as illustrated in FIG. 2.

Here, the above-described shapes have space forming parts a, b, and c covering a portion in which a space is formed when the folding separator 20 is wrapped (for reference, in FIG. 2, the space forming part is removed so that a region in which the space forming part is formed is distinguished, and the region in which the space forming part is defined is indicated by a dotted line).

Figure 3:
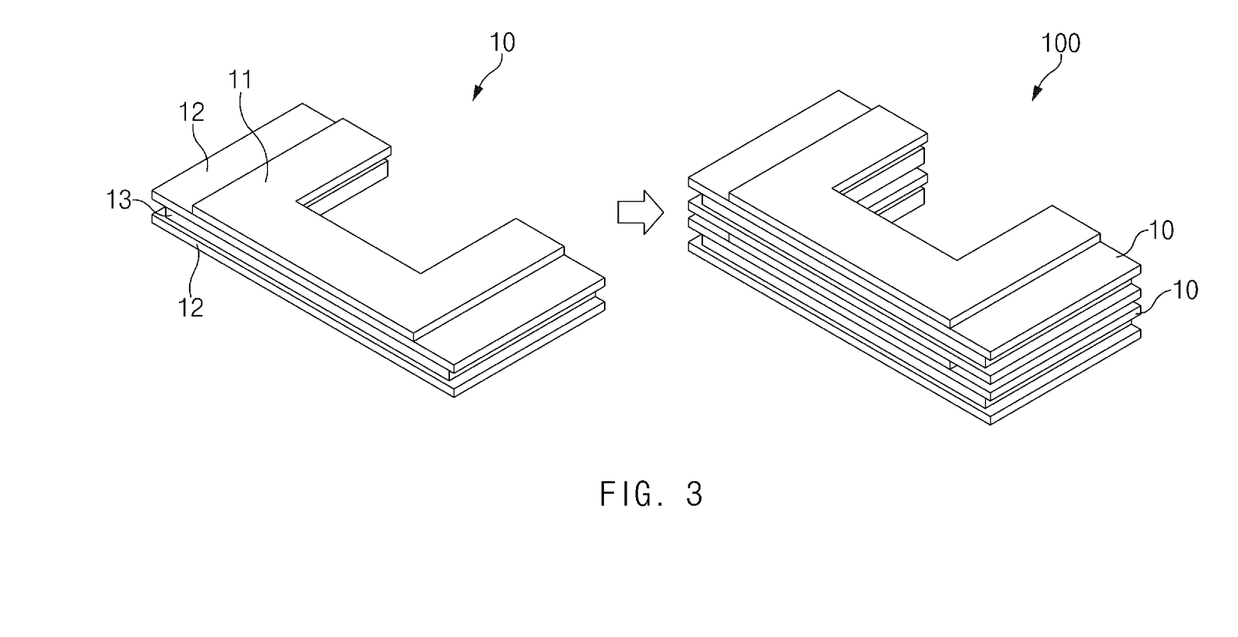
FIG. 3 is a perspective view illustrating a state in which a unit cell, in which the negative electrode, the separator, and the positive electrode are sequentially laminated upward, is laminated to form the laminate.

Also, as illustrated in FIG. 3, the negative electrode 13, the separator 12, and the positive electrode 11 are laminated in the form of a unit cell 10 having a mono-cell structure in which the separator 12, the negative electrode 13, and the separator 12, and the positive electrode 11 are sequentially laminated upward. Here, at least two or more unit cells 10 (preferably, about ten unit cells) may be laminated to form one laminate 100.

Figure 4:
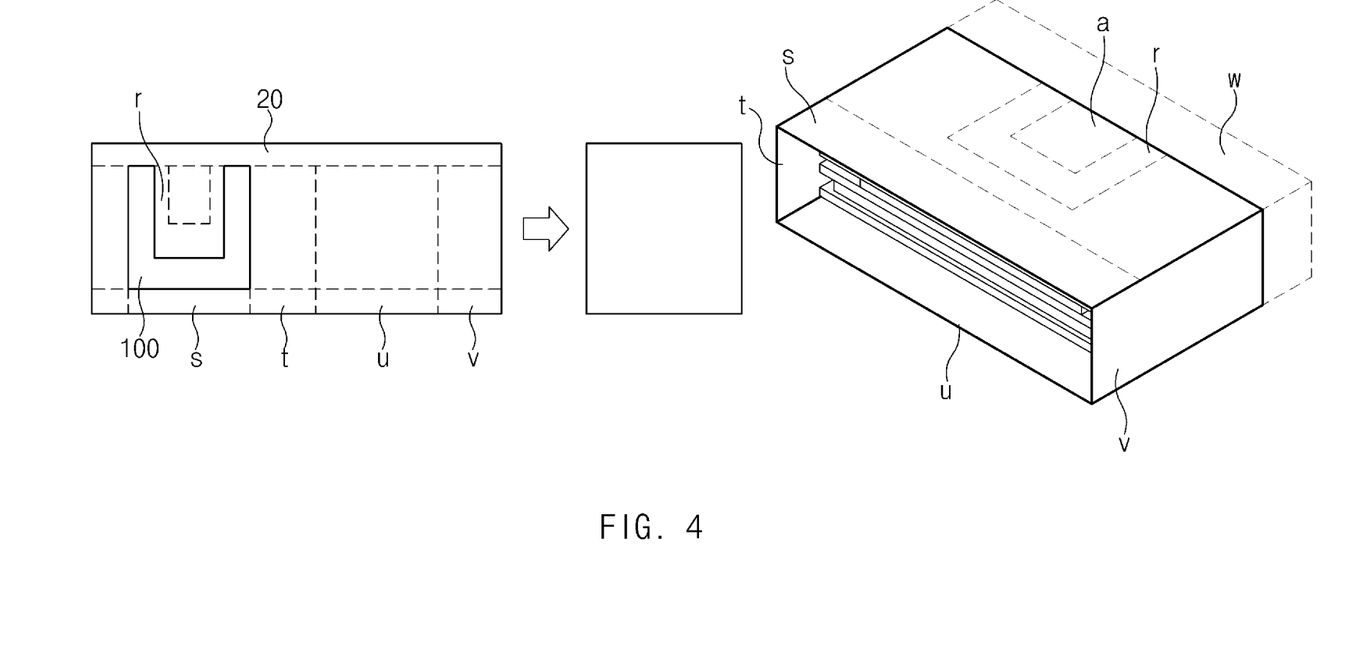
FIG. 4 is a view illustrating a state before and after the laminate is wrapped after being seated on the folding separator.

Then, as illustrated in FIG. 4, the laminate 100 is transferred onto the folding separator 20, and the folding separator 20 is folded in one direction to wrap the laminate 100. Here, the folding separator 20 may have an area that is enough to cover an entire surface of the laminate 100 and be folded in one direction to wrap the laminate 100 so that a space is formed between the folding separator 20 and the laminate 100. Thus, the space forming part a that is a region surrounding an inner space and surplus parts s, t, u, v, and w protruding respectively from edges of the laminate 100 are formed in the folding separator 20.

The space forming part a is removed by a forming device (not shown) for cutting or incising the folding separator 10 while pressing the folding separator 20 from one side, like the punching device p of FIG. 2. Here, the space forming part a is cut to a predetermined size (that is enough to cover the surface of the laminate) in which the surplus part r is additionally formed (i.e., only a portion of the space forming part is cut to be removed).

Also, the surplus parts r, s, t, u, v, and w are bonded to each other so that the laminate 100 is sealed by the folding separator 20. That is, when the folding is performed, some of the surplus parts r, s, t, u, v, and w protruding from the edges of the laminate 100 as a remaining portion of the folding separator 20 without being closely attached to the laminate 100 may be cut to be additionally folded to cover the exposed surface of the laminate 100 in a state of being cut to be discarded or partially overlapping each other. Here, ends of the surplus parts r, s, t, u, v, and w are bonded to each other to be finished.

Here, the folding separator 20 has toughness greater than that of the separator 12 laminated between the negative electrode 13 and the positive electrode 11 in the unit cell 10. In addition, the folding separator 20 may be made of a material that is capable of being bonded when heat is applied thereto. Thus, when the heat is applied in a state in which the surplus parts r, s, t, u, v, and w cover the exposed surface of the laminate 10, the folding separator 20 may be finished while maintaining in the above-described state.

In this embodiment, the laminate 100 is formed in a shape in which the space forming part is formed when the folding separator 20 is folded, for example, a shape in which the unit cell 10 is bent at one or more points. For example, the unit cell 10 may have a shape (i.e., the '⊏' shape) of which both sides having a straight line shape are bent at a right angle, but the bent portions are parallel to each other in the same direction as illustrated in FIG. 5, a shape (i.e., the 'L' shape) of which one side having a straight line shape is bent at a right angle as illustrated in FIG. 6, or a shape (i.e., the '☐' shape) of which one side having a straight line shape is bent at a right angle as illustrated in FIG. 7.

For reference, in this embodiment, since the punching device for punching the negative electrode 13, the separator 12, and the positive electrode to have the above-described shapes and the forming device for cutting the space forming part a are used by utilizing well-known devices, their detailed description will be omitted.

Embodiment 2

Furthermore, the present invention additionally provides an electrode assembly according to Embodiment 2, which is manufactured through the manufacturing method.

In this embodiment, the electrode assembly is manufactured so that a surface of a laminate 100 is finished by a folding separator 20. The laminate 100 is manufactured by laminating a plurality of unit cells 10, each of which is manufactured by laminating a negative electrode 13, a separator 12, and a positive electrode 11 and has a shape of which at least one or more points are bent. The folding separator 20 is made of a material having toughness greater than that of the separator 12 laminated between the negative electrode 13 and the positive electrode 11 in the unit cell 10. Also, the folding separator 20 has an area that is enough to cover an entire surface of the laminate 100 and is folded in one direction to surround the surface of the laminate 100.

Here, the folding separator 20 is finished as illustrated in FIGS. 5 to 7 so that surplus parts r, s, t, u, v, and w remaining after folding the laminate 100 cover the exposed surface of the laminate 100.

For reference, although not shown, a portion on which an electrode tab protruding from the electrode assembly and connected to the outside is formed may be configured to be selectively exposed through the folding separator within a range that does not affect performance of the electrode assembly according to the folding direction of the folding separator 20 or the finishing manner of the surplus parts r, s, t, u, v, and w.

The prevent invention having the above-described configuration may have the effect of improving the safety against the external impact because the folding separator 20 additionally wraps the electrode assembly even though the electrode assembly has the irregular shape according to the mounting conditions.

The folding separator 20 may have the relatively greater hardiness than that of the separator 12 and also be easily finished because the folding separator adheres when the heat is applied.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an electrode assembly, the method comprising:
    forming each of a negative electrode, a separator, and a positive electrode so that each of the negative electrode, the separator, and the positive electrode have a shape having a hole;
    laminating the negative electrode, the separator, and the positive electrode so that the holes are aligned so as to manufacture a unit cell;
    laminating at least two unit cells to form a laminate;
    folding in one direction a folding separator having an area that is large enough to cover an entire surface of the laminate to wrap an outside of the laminate;
    after folding the folding separator in the one direction, removing a portion of a space forming part that is a portion of the folding separator surrounding a space formed by the aligned holes when the folding separator is folded to wrap the outside of the laminate; and
    bonding surplus parts that are portions of the folding separator, which are not initially attached to the laminate, to each other after the portion of the space forming part is removed to cover an exposed surface of the laminate so that the laminate is sealed by the folding separator.

2. The method of claim 1, wherein the unit cell has a shape in which at least one edge of the unit cell is bent.

3. The method of claim 2, wherein the unit cell has a "c" shape.

4. The method of claim 2, wherein the unit cell has a "L" shape.

5. The method of claim 1, wherein the folding separator is made of a material having a toughness greater than that of the separator laminated between the negative electrode and the positive electrode in the unit cell.

6. The method of claim 1, wherein the space forming part is cut from the folding separator by using a forming device, and wherein the space forming part is removed such that a size of each of the surplus parts is enough to cover at least a portion of an adjacent surface of the laminate to finish the folding separator by bonding the surplus parts to each other.

7. The method of claim 1, wherein the folding separator is made of a material that is capable of being bonded when heat is applied thereto.

8. The method of claim 1, wherein the unit cell has a mono-cell structure in which the separator, the negative electrode, the separator, and the positive electrode are sequentially laminated upward.

* * * * *